(12) United States Patent
Chen

(10) Patent No.: US 6,576,095 B2
(45) Date of Patent: Jun. 10, 2003

(54) PROTECTIVE COATING FOR A MAGNETO-OPTICAL DISC

(75) Inventor: Ga-Lane Chen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/977,102

(22) Filed: Oct. 12, 2001

(65) Prior Publication Data

US 2002/0141294 A1 Oct. 3, 2002

Related U.S. Application Data

(62) Division of application No. 09/338,682, filed on Jun. 23, 1999, now Pat. No. 6,349,076.
(60) Provisional application No. 60/090,480, filed on Jun. 24, 1998.

(51) Int. Cl.[7] .......................... C23C 14/54; B05D 5/12; B05D 5/06; B05D 1/36
(52) U.S. Cl. .......................... 204/192.16; 204/192.15; 427/131; 427/162; 427/402
(58) Field of Search .................... 427/131, 162, 427/384, 402, 445; 204/192.15, 192.16

(56) References Cited

U.S. PATENT DOCUMENTS

| | | | | |
|---|---|---|---|---|
| 5,028,305 A | * | 7/1991 | Willson et al. | 204/192.2 |
| 5,112,701 A | | 5/1992 | Katsuragawa | 428/694 |
| 5,361,248 A | | 11/1994 | Hatwar et al. | 369/275.2 |
| 5,615,180 A | | 3/1997 | Mieda et al. | 369/13 |
| 5,665,467 A | | 9/1997 | Nakayama et al. | 428/332 |
| 5,719,831 A | | 2/1998 | Nakayama et al. | 369/13 |
| 5,854,775 A | | 12/1998 | Izumi et al. | 369/13 |
| 5,855,746 A | * | 1/1999 | Prabhakara et al. | 204/192.16 |
| 6,110,610 A | | 8/2000 | Fujita et al. | 428/694 |
| 6,127,017 A | | 10/2000 | Hirata et al. | 428/64.1 |
| 6,136,403 A | | 10/2000 | Prabhakara et al. | 428/65.3 |
| 6,160,769 A | | 12/2000 | Ohnuki et al. | 369/13 |

* cited by examiner

Primary Examiner—Steven H. VerSteeg
(74) Attorney, Agent, or Firm—Westman, Champlin & Kelly

(57) ABSTRACT

A magneto-optical disc includes protective overcoats that significantly improve the durability of the disc. In particular, the protective overcoat involves a carbon layer over the magnetic, optical data storage layer. The magnetic, optical data storage layer includes a magnetic metal or alloy with a Curie temperature accessible by optical heating. In preferred embodiments, the carbon coating has a small absorption coefficient for selected optical frequencies.

18 Claims, 8 Drawing Sheets

PROTECTIVE COATING FOR A MAGNETO-OPTICAL DISC

CROSS REFERENCE TO RELATED APPLICATIONS

The present application is a divisional application of U.S. Ser. No. 09/338,682, filed Jun. 23, 1999, now U.S. Pat. No. 6,349,076 B1, which claims priority from U.S. Provisional Application Serial No. 60/090,480 filed on Jun. 24, 1998, entitled "DESIGN OF HYBRID OVERCOAT FOR MAGNETO-OPTICAL RECORDING MEDIA," incorporated herein by reference.

BACKGROUND OF THE INVENTION

The invention relates to magneto-optical disc having an improved surface coating. More particularly, the invention relates to a magneto-optical disc with a protective overcoat that improves the tribological properties and reduces wear.

A variety of media can be used for electronic data storage. In particular, magnetic discs have been used extensively for high density data storage. In addition, optical data storage disc systems are useful for storing large quantities of data. The data is accessed by focusing a light beam, generally a laser beam, onto a data surface of a disc and detecting light reflected from or transmitted through the data surface.

Generally, in optical data storage systems, data is in the form of physical or magnetic marks carried on the surface of the disc. The physical or magnetic marks are detected using the laser light. Phase change and magneto-optical systems provide erasable optical disc systems, which are clearly desirable for certain applications. Magneto-optical systems read data by measuring the rotation of the incident light polarization due to reflection from a magnetic material within the storage medium.

A magneto-optical disc includes a recording layer of a magnetic material. The magnetic material in the recording layer can be magnetized in an oriented direction. The data generally is stored in concentric tracks.

To read data from the disc, an optical pickup device is used. The optical pickup device irradiates the disc with a low power light beam, generally from a laser, and detects the reflected light. Changes in the polarization of the light due to the Kerr effect can be measured in the reflected light. Using the change in polarization, the magnetization of the point on the recording layer can be measured.

To record/write or erase information, the recording layer is heated to a temperature above the Curie temperature by irradiating the material with a more intense light beam, generally from a laser. The magnetization of the heated point on the recording layer can be changed with an external magnetic field. To write data on the disc, a magnetic head is used for supplying the external magnetic field. The same magnet or a separate magnet can be used to erase or initialize the disc.

When only a single magnetic layer is used, it is required to initialize the magnetic layer by aligning the magnetization of the magnetic layer in one direction before writing data. This process can be simplified by using multiple magnetic layers. Two, three or more magnetic layers can be used to facilitate the reading and writing operations. With any of the magneto-optical disc structures, an important design consideration is that light must be able to focus on a magnetic data storage layer having an appropriately selected Curie temperature.

SUMMARY OF THE INVENTION

In a first aspect, the invention pertains to a magneto-optical storage medium comprising:

a data storage means for the optical encoding of data; and protection means for improving the durability of the magneto-optical storage media.

In another aspect, the invention pertains to a magneto-optical storage medium comprising:

a non-magnetic substrate;

a magnetic layer over the non-magnetic substrate, the magnetic layer comprising a magnetic metal or alloy having a Curie temperature accessible by optical heating;

a carbon layer over the magnetic layer.

In a further aspect, the invention pertains to a method of producing a magneto-optical disc comprising depositing a carbon layer onto a disc with a magnetic layer comprising a magnetic metal or alloy having a Curie temperature accessible by optical heating.

DETAILED DESCRIPTION OF THE PREFERRED EMBODIMENTS

Figure 1:
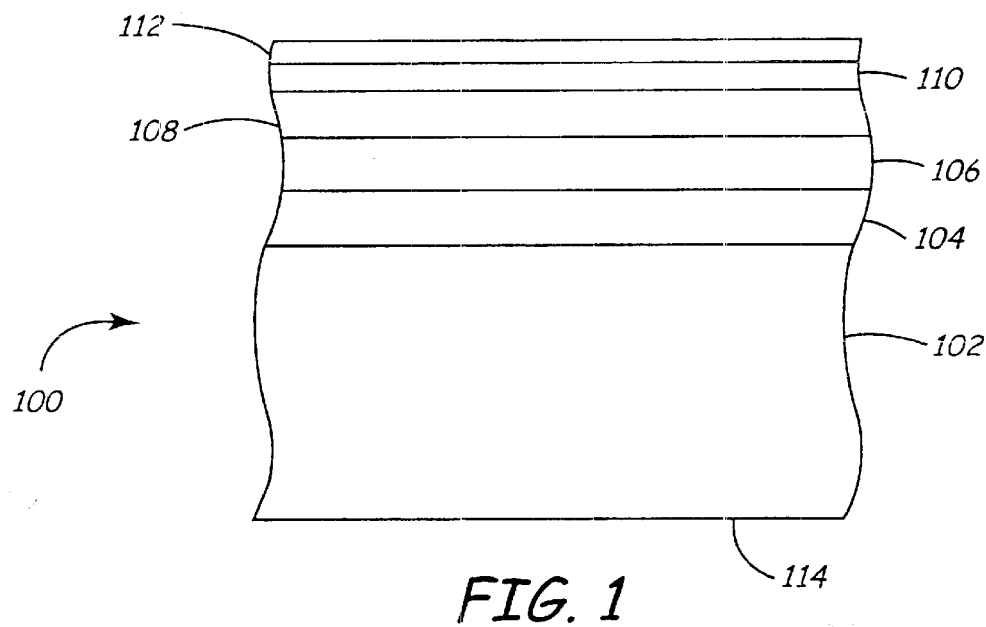
FIG. 1 is a schematic, fragmentary sectional view of a magnetic disc with an improved overcoat.

It has been discovered that a thin protective layer can be placed over the surface or a portion of the surface of a magneto-optical disc to improve the tribological properties of the disc. The protective layer can be used without interfering with the optical properties required for the function of the disc. In particular, a thin carbon layer, optionally, topped with a thin lubricant layer provides both additional protection for the functional layers and an improved hydrodynamic interface. Thus, the fly height of heads used for reading and/or writing on the disc can be reduced without resulting in an undesirably short lifetime of the disc due to interactions between the head and the disc surface.

A design requirement for magneto-optical disc is that focused light must be able to reach and thereby heat a magnetic layer. To perform the magnetization and optical functions, one or more sliders/heads functioning as an optical head and/or magnetic head must fly over the spinning disc during operation. To increase storage densities, fly heights can be decreased such that the head flies closer to the disc surface. Decreasing fly heights impose severe requirements on the tribological performance of both the disc and the head. Approaches for improving the hydrodynamic properties of the disc surface cannot interfere significantly with the optical and/or other properties of the disc surface. At the same time, the disc must be durable. Contact between the disc surface and a read/write head can damage the disc and/or induce wear on the disc surface.

Conventional overcoats for the magneto-optical media include a dielectric ceramic material, such as $SiN_x$, $AlN_x$, $AlO_x$ and/or $SiO_x$, with a thickness from about 700 angstroms (Å) to about 1200 Å. To increase the durability and improve the hydrodynamic character, a thin carbon layer is placed over the dielectric ceramic layer and a thin lubricant layer optionally is placed over the carbon layer. The carbon layer and the lubricant layer significantly increase the durability and improve the tribological properties of the disc-head interface. In particular, for one design examined durability was improved such that a uncoated disc which suffered significant damage in a single cycle of a Contact-Start-Stop test to being able to survive thousands of cycles of the test. For designs in which the light must focus through the top surface of the disc, the protective overcoat layers preferably do not interfere significantly with the optical properties of the disc.

The magnetic layer on the disc includes at least one layer of a magnetic material that has a Curie temperature that can be reached by irradiation with a focused laser beam. Thus, irradiation of a spot of the magnetic material can be used to write and/or erase data at that point. Additional magnetic coats with different properties can be included to facilitate the reading, writing and/or erasing operations. The magnetic materials generally include metal alloys with desired magnetic field strengths and Curie temperatures.

Referring to FIG. 1, a fragmentary cross sectional view of the general structure of an improved disc 100 is depicted schematically. Improved disc 100 includes a substrate 102, an undercoat 104, a magnetic layer 106, a dielectric overcoat 108, a carbon overcoat 110 and, in preferred embodiments, a lubricant overcoat 112. Each functional layer 104–112 can include multiple physical layers. As described further below, functional layers 104–112 can be repeated in their mirror image on bottom surface 114 of substrate 102.

Substrate 102 forms a majority of the disc bulk. Thus, substrate 102 supports the functional layers for data storage. Substrate 102 can be formed, for example, from an organic polymer material, metal, glass, a ceramic material or a combination thereof. Preferred metals include aluminum or aluminum alloy plated with NiP.

In one approach to the use of a magneto-optical disc, the light is transmitted through the substrate to the magnetic layer. The optical components for focusing the light onto the disc surface are located on the side of the magneto-optical disc opposite the magnetic layer while an external magnet or magnets for altering the magnetic orientation of the magnetic layer are located on the side of the disc near the magnetic layers. In alternative embodiments, the optical components and the external magnet(s) are both placed on the side of the disc adjacent the magnetic layer. If the optics are placed on the side of the disc adjacent magnetic layer 106, substrate 102 and undercoat 104 do not need to be transparent to light.

Undercoat 104 generally includes one or more dielectric layers. Suitable materials for the formation of the dielectric layer include, for example, $SiN_x$, $SiO_x$, $AlN_x$, $AlO_x$ or combinations thereof. The dielectric layers make good water vapor free layers to protect the magnetic layer from corrosion. The dielectric layer preferably has a thickness from about 50 Å to about 100 Å.

If undercoat 104 does not need to be transparent, undercoat 104 can also include a layer of aluminum or aluminum alloy, such as AlCr, AlTi, AlCu, or AlMo. The aluminum or aluminum alloy layer can function as a heat sink and reflective layer. Having a heat sink provides better control of the heating to erase or overwrite the magnetic layer and reduction in noise in the measurement of reflected light from magnetic layer 106. Increasing reflection also improves the signal-to-noise ratio, i.e., carrier-to-noise ratio, of the measurements since the signal results from the reflected light.

Figure 2:
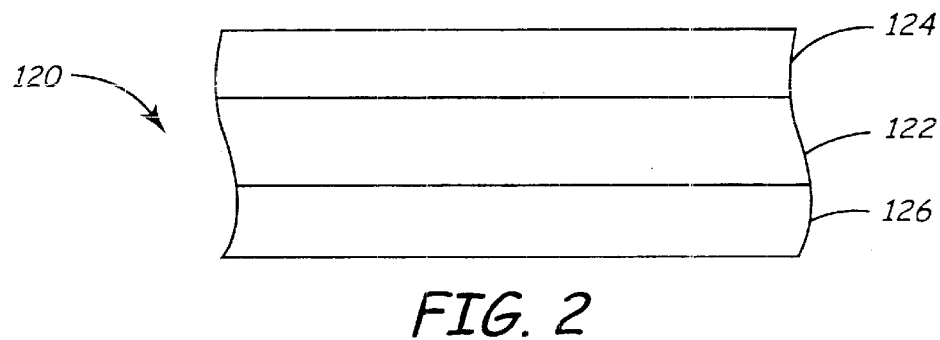
FIG. 2 is a schematic, fragmentary sectional view of an embodiment of an undercoat.

The aluminum or aluminum alloy layer can be located adjacent a dielectric layer or between two dielectric layers. A preferred embodiment of an undercoat layer 120 with an aluminum or aluminum alloy layer 122 between two dielectric layers 124, 126 is depicted in FIG. 2. Dielectric layer 124 can help to protect magnetic layer 106 and layer 122 from corrosion. Similarly, dielectric layer 126 keeps moisture away from substrate 102 to reduce corrosion and film adhesion problems. In addition, dielectric layer 124 can improve optical recording and reduce the servo read out modulation signal to facilitate oriention of a read/write element or slider along the disc surface.

Magnetic layer 106 can include one or more layers of ferromagnetic alloy. Preferred ferromagnetic alloys are formed from one or more rare earth elements and one or more transition metals. Examples of suitable ferromagnetic alloys include, for example, TbFeCo, GdFeCo, TbFeCoZr, DyFeCo, and GdDyFeCo. The particular composition of the alloy is selected to obtain a desired Curie temperature and magnetic coercivity.

In the simplest embodiments, magnetic layer 106 includes a single layer of ferromagnetic alloy. The ferromagnetic alloy has a Curie temperature that can be reached by shining a relatively intense laser beam at a spot on the ferromagnetic alloy. Similarly, the Curie temperature must be significantly higher than the operating temperature of the disc drive such that thermal effects do not result in data loss. Reasonable ranges for the Curie temperature are from about 250° C. to about 350° C., and preferably near 300° C.

The Curie temperature ($T_c$) is a phase transition temperature above which the magnetization of a ferromagnetic vanishes and the material becomes paramagnetic. When the temperature of the material cools below the Curie temperature in the presence of an external magnetic field, the magnetization of the resulting ferromagnetic is oriented according to the external field.

Magnetization can be used for data storage because the polarization of light striking the ferromagnetic material will be effected by the orientation of the magnetic field. This is termed the Kerr effect. In particular, circularly polarized light will be effected upon reflection from a magnetic material having a component, of the magnetization parallel or anti-parallel to the direction of impinging radiation. The effect of the ferromagnetic material on the polarization of the reflected is different if the magnetic component is parallel or anti-parallel to the incident direction of the impinging radiation. This change in polarization can be measured. Therefore, retrievable information can be stored based on the orientation of the magnetization at a point along the magnetic (magneto-optical) layer.

Figure 3:
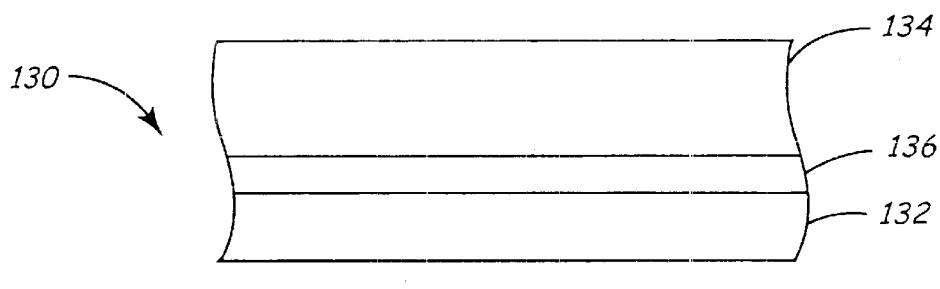
FIG. 3 is a schematic, fragmentary, sectional view of an embodiment of a magnetic layer.

The use of a single ferromagnetic layer is found to provide measurements with a low carrier-to-noise ratio and difficulties with respect to reinitializing the magnetization in order to overwrite the data. A variety of approaches using multiple ferromagnetic layers have been used to improve the performance properties of magneto-optic storage materials. These multiple layer structures generally include a memory or data storage layer with a relatively low Curie temperature and a reference layer with a relatively high Curie temperature. A two ferromagnetic layer structure 130 for the magnetic layer is shown schematically in FIG. 3. The ferromagnetic reference layer 132 is adjacent ferromagnetic memory layer 134. An optional spacer layer 136 is shown between ferromagnetic layers 132, 134. Spacer layer 136 can be another ferromagnetic layer or a dielectric layer.

A low field magnetic is used for writing/erasing memory layer 132 and a high field magnetic is used for initializing reference layer 130. The intensity of the laser beam can be varied to alternatively effect both the reference and memory layers 130, 132 or just memory layer 130. If the Curie temperature of reference layer 130 is high enough, the magnetization of reference layer 130 can be established once during fabrication such that its magnetization remains unchanged during use.

Several multiple ferromagnetic layer structures are described in U.S. Pat. No. 5,361,248 to Hatwar et al., entitled "Direct Overwrite Magneto-Optical Storage Medium Not Requiring an Initialization Magnet," incorporated herein by reference. In addition, magneto-optical discs with three ferromagnetic layer structures are described in U.S. Pat. No. 5,615,180 to Mieda at el., entitled "Magneto-Optical Recording Medium and Magneto-Optical Recording Apparatus Capable of Performing a Light-Modulation Overwriting Operation, and U.S. Pat. No. 5,665,467 to Nakayama et al., entitled "Magneto-Optical Recording Medium," both of which are incorporated herein by reference.

Figure 4:
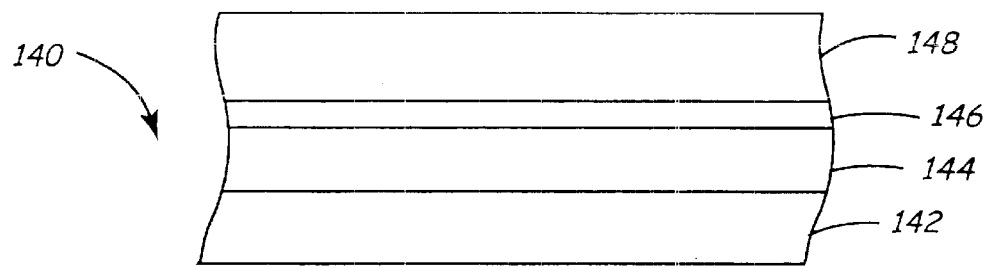
FIG. 4 is a schematic, fragmentary sectional view of a preferred embodiment of a magnetic layer.

In a particularly preferred embodiment of the magnetic layer, shown in FIG. 4, magnetic layer 140 has a write assist layer 142, a recording layer 144, an auxiliary layer 146 and a magnetic readout layer 148. Write assist layer 142 preferably comprises a magnetic rare earth/transition metal alloy, such as TbFe, TbFeCo or FeCoX, where X is Dy, Gd or Sm, and preferably has a thickness of about 10 nm (100 Å). Write assist layer 142 preferably has a Curie temperature ($T_c$) of about 250° C. Write assist layer 142 provides stability for the use of higher data storage density on the disc.

Recording 144 can comprises a rare earth/transition metal alloy, such as TbFe, TbFeCo, TbFeCoX, DyFeCoX and the like, where X is Al, Y or Nd. Recording layer 144 has a high Curie temperature, perpendicular anisotropy and thermal-magnetic features, in particular, a coercivity ($H_c$) and magnetic moment that preferably are a function of temperature. Recording layer 144 preferably has a thickness from about 25 nm to about 40 nm. Recording layer 144 is used for writing data to the disc.

Auxiliary layer 146 can be a dielectric material, such as a water vapor free material, which can comprise $SiN_x$, $AlN_x$, $SiO_x$ or $AlO_x$. Alternatively, auxiliary layer 146 can be a rare earth transition metal alloy with a low Curie temperature and a high coercivity. Auxiliary layer 146 preferably has a thickness of about 10 nm.

Magnetic readout layer 148 is formed from a rare earth/transition metal alloy, such as GdFeCo, GdFeCoX or GdFeCoXY, where X is Al, Y, or Nd, and Y is Cr, Ta, or Nb. Magnetic readout layer 148 is particularly preferred for use in a magneto-optical disc designed for shining light from the top surface rather than through the substrate. Such a configuration for the magneto-optical disc is called first surface recording and is described further below. Data stored on recording layer 144 is copied onto readout layer 148 for reading the data. Auxiliary layer 146 facilitates the data transfer from recording layer 144 to readout layer 148

A preferred embodiment of the structure in FIG. 4 is summarized in Table 1.

| Layer | | $T_c$ | $H_c$, Oe in perpendic. direction | Thickness |
| --- | --- | --- | --- | --- |
| 142 | GdFeCo | 250° C. | <500 | 10 nm |
| 144 | TbFeCo | 250–350° C. | >10,000 | 25–40 nm |
| 146 | TbFeCoAl | 120° C. | >10,000 | 10 nm |
| 148 | GdFeCo | >300° C. | <3000 | 25–30 nm |

The carbon layer preferably includes amorphous hydrogenated carbon, amorphous nitrogenated carbon and/or amorphous hydro-nitrogenated carbon. In some preferred embodiments, the carbon layer includes from about 10 to about 40 molar percent hydrogen and more preferably from about 20 to about 30 molar percent hydrogen. In some preferred embodiments, the carbon layer includes from about 5 to about 30 molar percent nitrogen. Preferred embodiments of a hydro-nitrogenated carbon layer include from about 3 to about 10 molar percent nitrogen and from about 15 to about 30 molar percent hydrogen. Hydrogenated carbon is preferred because it has a lower absorption coefficient for light wavelengths from about 400 nm to about 700 nm. In preferred embodiments, the carbon layer has a thickness greater than about 25 Å, preferably from about 25 Å to about 50 Å, and more preferably from about 25 Å to about 38 Å.

The carbon coating can have a profound impact on the durability of the disc. In particular, a magneto-optical disc without a carbon coating obtains a wear mark during a single cycle of Contact-Start-Stop (CSS) testing. During a CSS test cycle, the magnetic head begins in contact with the disc. Then, the disc is accelerated to a selected rotational speed. After maintaining this rotational speed for a short period of time, the disc is stopped such that the head comes into contact with the disc again. With the addition of a carbon coating, the disc preferably can endure more than a 1000 cycles, more preferably more than about 1500 cycles and even more preferably more than about 2000 cycles of a CSS tester. With the further addition of a lubricant layer, the disc preferably can endure more than 20,000 cycles with a hydrogenated carbon coating.

For magneto-optical disc structures with the light illuminated through the top surface, the carbon layer preferably is highly transmitting of the light frequency used. The light wavelength is about 660 nm for a red laser and about 410 nm for a blue laser. In particular, the carbon layer preferably has an absorption coefficient at both 660 nm and 410 nm of less than about 1.0, preferably less than about 0.5, more preferably less than about 0.15 and more preferably less than about 0.1. It is especially preferred for the carbon layer to have an absorption coefficient of about 0. Hydrogenated carbon has a significantly smaller absorption coefficient for a given coating thickness compared with nitrogenated carbon or hydro-nitrogenated carbon. Different types of carbon coatings generally have similar reflectivities. Thus, the carbon coating greatly improves the durability of the magneto-optical media without changing significantly the carrier-to-noise ratio (CNR).

Optional lubricant overcoat 112 comprises a polymeric material. Lubricant overcoat 112 preferably has a thickness less than about 35 Å, preferably less than about 30 Å, more preferably between about 15 Å and about 25 Å.

Preferred polymers include, for example, fluorinated polymers, such as perfluoropolyethers and derivatives thereof. Suitable unsubstituted perfluoropolyethers polymers include, for example, FOMBLIN® Z-60 lubricant (average molecular weight (AMW)=about 60,000 atomic mass units (AMU) or Daltons), FOMBLIN® Z-25 lubricant (AMW=about 25,000 AMU) and FOMBLIN® Z-15 lubricant (AMW=about 15,000 AMU). The FOMBLIN® unsubstituted perfluoropolyethers made by Montedison (Ausimont) S.P.A., Milan, Italy have molecular formulas of $CF_3O(CF_2CF_2O)_n(CF_2O)_mCF_3$, where n and m vary to yield particular products with average molecular weights of specified values.

Suitable fluorinated polyethers include perfluoropolyethers with functional end groups. Suitable difunctional perfluoropolyethers include, for example, FOMBLIN® Z-DOL lubricant (hydroxyl end groups), FOMBLIN® AM2001 lubricant (piperonyl end groups), and FOMBLIN® Z-DISOC lubricant (isocyanate end groups). Fluorinated polymers with functional end groups may help the lubricant overcoat bind to a carbon substrate. Other suitable perfluoropolyethers are available under the tradenames DEMNUM® lubricant from Daikin Kogyo Co., Japan and KRYTOX® lubricant from DuPont, Wilmington, Del., having a basic molecular formula of $F(CF_2CF_2CF_2)_nCF_2CF_3$.

Figure 5:
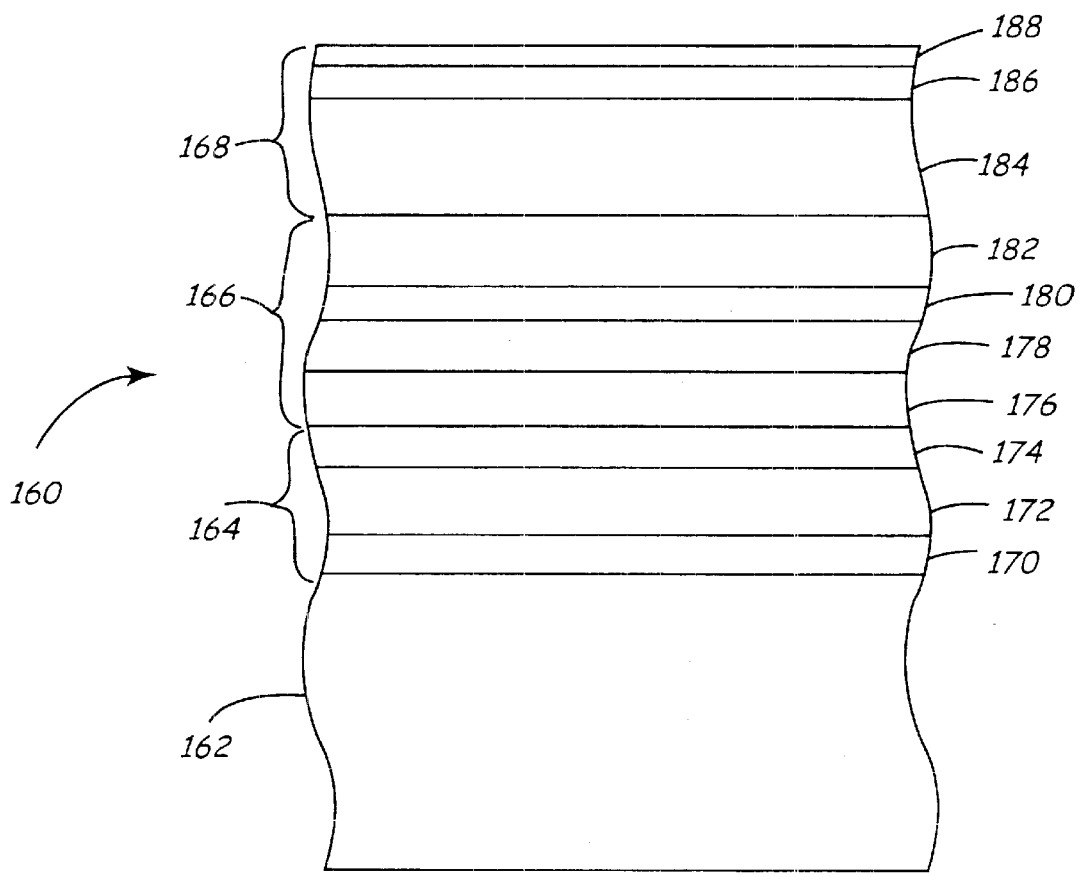
FIG. 5 is a schematic, fragmentary, sectional view of a preferred embodiment of a magnetic disc with an improved overcoat.

Preferred embodiments have been described for the layers shown in FIG. 1. The various preferred layers can be combined in the formation of a particularly preferred magneto-optical disc structure 160, as shown in FIG. 5. Magneto-optical disc 160 includes a substrate 162, an undercoat 164, a magnetic layer 166 and a composite overcoat 168. Undercoat 164 includes a first dielectric layer 170, a reflective/heat sink layer 172 and a second dielectric layer 174, where the heat sink layer 172 is between dielectric layers 170, 174. Magnetic layer 166 includes a write assist layer 176, a recording layer 178, an auxiliary layer 180 and a magnetic readout layer 182. Composite overcoat 168 includes a dielectric layer 184, carbon layer 186 and lubricant overcoat 188.

Figure 6:
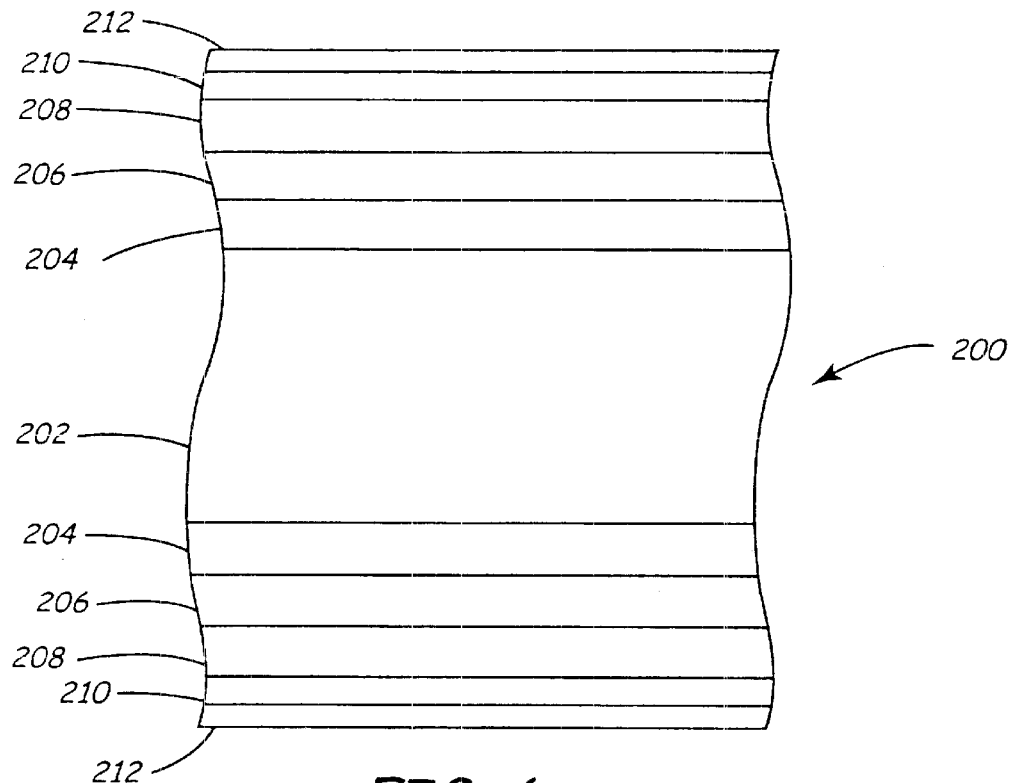
FIG. 6 is a schematic, fragmentary sectional view of a magnetic disc with a magnetic recording layer on each surface of the substrate.

As noted above, both surfaces of the substrate can each include a set of functional, i.e., magnetic layers. Structure on either side of the substrate may or may not be identical mirror images of each other. Generally, in preferred embodiments, the layers on either side of the substrate are mirror images of each other, such that the magneto-optical disc is approximately symmetric in the plane passing through the center of the substrate, or equivalently the disc. One approach to the formation of a magneto-optical disc with magnetic layers along both surfaces involves gluing together two discs with single magnetic layers, such as shown in FIG. 1. Alternatively, appropriate films can be coated onto boht sides of a substrate. A magneto-optical disc 200 with symmetric magnetic layers relative to substrate 202 is shown in FIG. 6. Disc 200 includes undercoats 204, magnetic layers 206, dielectric overcoats 208, carbon overcoats 210 and optional lubricant overcoats 212.

Figure 7:
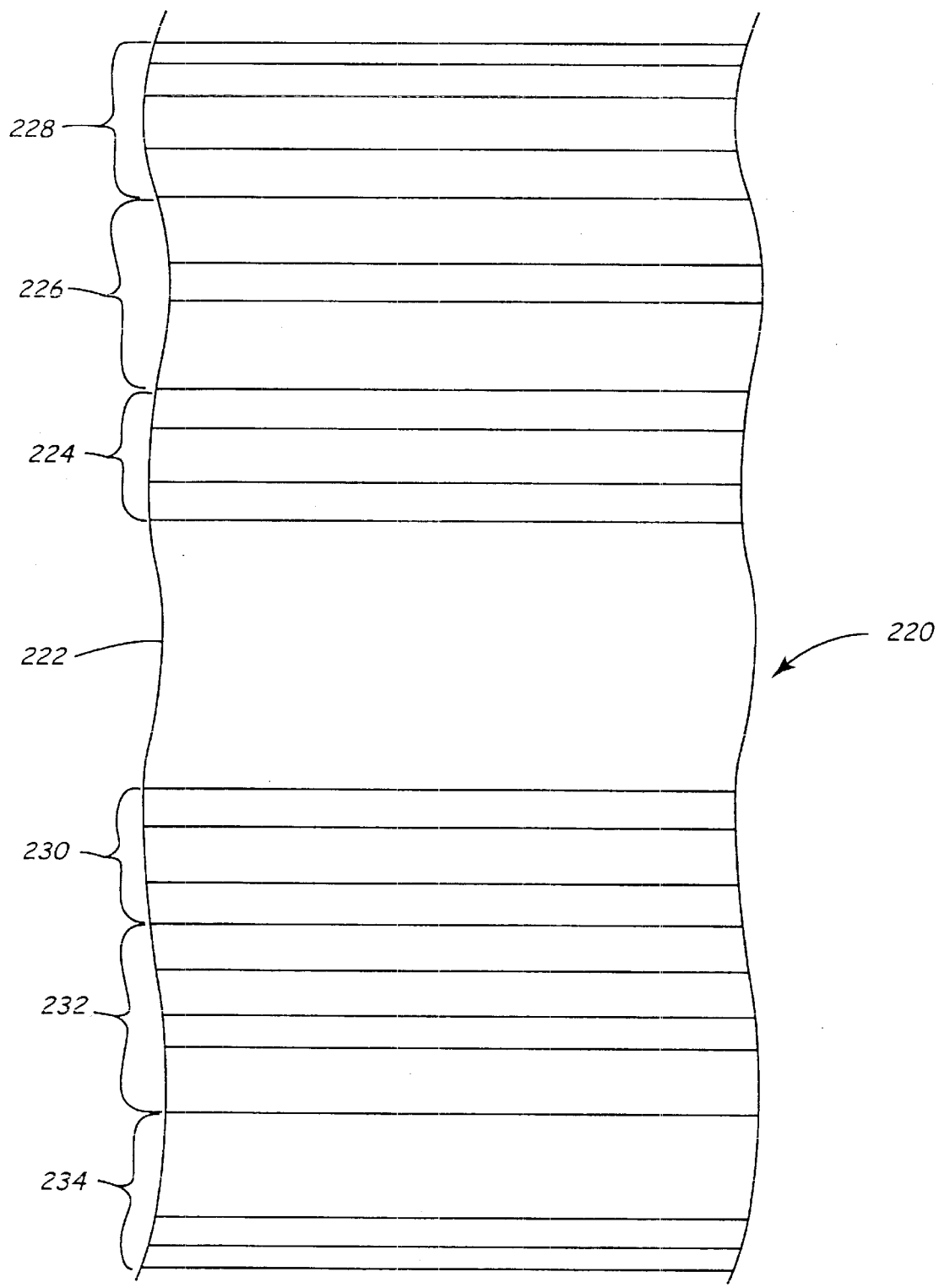
FIG. 7 is a schematic, fragmentary, sectional view of an alternative preferred embodiment of a magnetic disc with an improved overcoat having a magnetic layer on both sides of the disc.

In a particularly preferred embodiment, the structure shown adjacent the substrate in FIG. 5 is repeated on the other side of the substrate. Such a preferred embodiment of a magneto-optical disc 220 is shown in FIG. 7. Substrate 222 is located at the center of disc 220. An undercoat layer 224, magnetic layer 226 and composite overcoat 228 are located at the top surface of substrate 222. Layers 224, 226 and 228 have structures corresponding respectively to layers 164, 166 and 168 of FIG. 5. Undercoat layer 230, magnetic layer 232 and composite overcoat layer 234 are respectively the mirror images of layers 224, 226 and 228.

Generally, the undercoat layer or layers and the layer or layers of the magnetic layer can be deposited by vapor deposition approaches, such as sputtering. Various forms of sputtering can be used, such as facing target sputtering, DC magnetron sputtering, RF magnetron sputtering, DC diode sputtering, RF diode sputtering, or physical vapor deposition sputtering. Other vapor phase approaches can be used to deposit the layers such as chemical vapor deposition, ion implantation, plasma spraying, plasma enhanced chemical vapor deposition, thermally assisted evaporation, and electron beam assisted vapor deposition. The dielectric layers can be deposited by performing the sputtering or other deposition approach with hydrogen and/or nitrogen generally diluted with argon or other inert gas in the atmosphere surrounding the surface.

The dielectric layer and carbon layer of the composite overcoat can be deposited using these vapor phase deposition approaches. The structure of the carbon layer generally depends on the deposition approach. In particular, the carbon layer can be, for example, amorphous, graphitic, diamond-like-carbon, or a mixture thereof. The carbon layer generally is deposited with hydrogen and/or nitrogen in the atmosphere surrounding the substrate. To form the nitrogen or hydrogen doped carbon coatings, the sputtering is performed in the presence of about 5 percent to about 30 percent nitrogen or hydrogen in argon. A lubricant overcoat can be applied by dipping, buffing, brushing, spin coating, and the like. The concentration of lubricant in the lubricant layer generally is in the range of 0.2% to about 0.3% with the balance being solvent, such as $C_6F_{14}$, $C_4F_9OCH_3$, $C_4F_9OC_2H_5$, $C_5H_2F_{10}$, or mixtures thereof.

A relatively weak light source is used to read the stored data. Preferred light sources include a laser with an intensity of about 3 to 4 milliwatts (mW). To write onto the disc, a stronger light source, such as a 10 mW laser is used to heat the read layer above its Curie temperature. A write layer assists with the initialization of the read layer prior to setting the orientation of the magnetic moment in the read layer using a magnet in a write head. To perform first surface recording, the write head preferably includes optics for directing light onto the disc for reading and/or writing. As noted above, a write assist layer can be used to stabilize the magnetization of all the magnetic layers, which can be especially helpful as the storage density increases.

Figure 8:
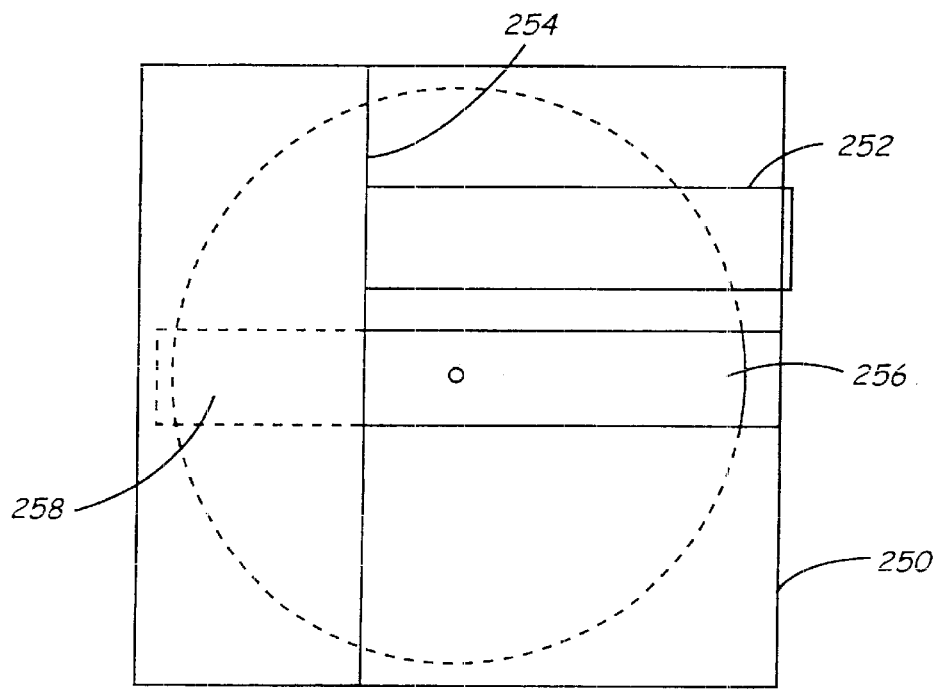
FIG. 8 is a top view of a cartridge holding a magnetic optical disc.

For distribution, a magneto-optical disc can be assembled into a cartridge 250, as shown schematically in FIG. 8. In this embodiment, cartridge 250 includes slide 252 that moves along track 254, such that slide 252 can be moved to expose a portion of magneto-optical disc 256 to the exterior of cartridge 250. Thus, with slide 252 move appropriately, a head and/or other magnetic or optical components can be brought into the proximity of the surface of disc 256. Cartridge 250 can include a magnet 258. Magnet 258 can be used to initialize a write layer or other similar magnetic layer. Magnet 258 is moved into place when needed. Magnet 258 can be used effectively especially in embodiments where light is directed through the substrate.

Alternatively, a magneto-optical disc can be part of a hard disc drive. Suitable hard disc drives include Optically Assisted Winchester Drives and Optically Assisted Writing Drives. A hard drive 262 is shown schematically in a cut away view in FIG. 9. A magneto-optical disc 264 is attached on a drive motor 266.

Figure 9:
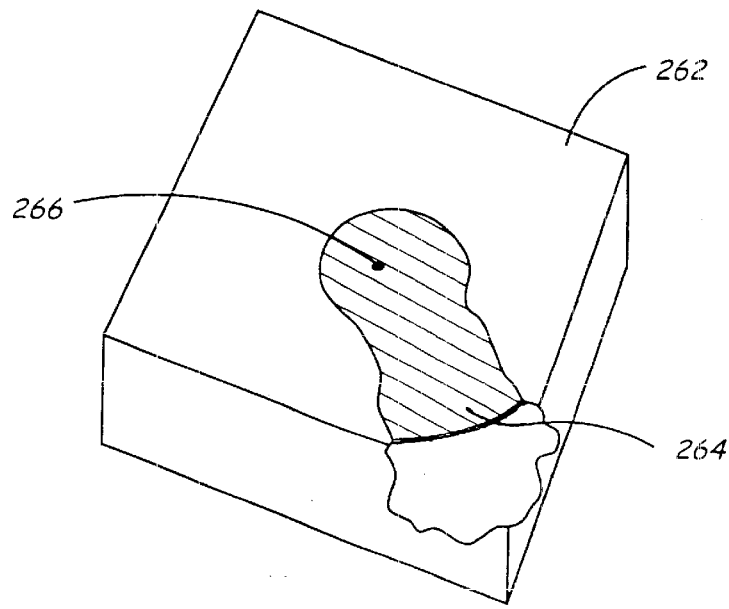
FIG. 9 is a cut away, perspective view of a hard disc drive including a magnetic optical disc.

A magneto-optical disc is used in conjunction with a disc drive system for reading/writing, such as shown schematically in FIG. 9. The disc drive can be a hard disc drive, a disc drive that interfaces with a disc cartridge, or the like. Disc drive 270 includes a disc drive 272 that supports and rotates magneto-optical disc 274. Actuator 276 controls arm 278 such that head 280 at the end of arm 278 is positioned over a desired portion of disc 274. Actuator 276 can move arm 278 by rotation or lateral motion. The embodiment shown involves first surface reading where light is directed from light source 282 to the top surface of disc 274. Light can be directed along optical fiber 284 or other suitable optical components. Read/write unit generally is interfaced with a computer processor 286. If desired, the disc drive can be designed for use with cartridges containing magneto-optical discs such as the cartridge shown in FIG. 8.

The optical properties were examined for three different carbon films. The three carbon films were, respectively, a hydrogenated carbon film, a nitrogenated carbon film and a hydro-nitrogenated film. The carbon films were deposited by AC reactive sputtering using an AC power supply operating in the frequency range from about 40 KHz to about 400 KHz to a thickness from about 25 to 50 Å. The hydrogenated carbon included about 25 mole percent hydrogen. The nitrogenated film included about 15–20 mole percent nitrogen. The hydro-nitrogenated carbon included about 5 mole percent nitrogen and about 20 mole percent hydrogen.

Figure 10:
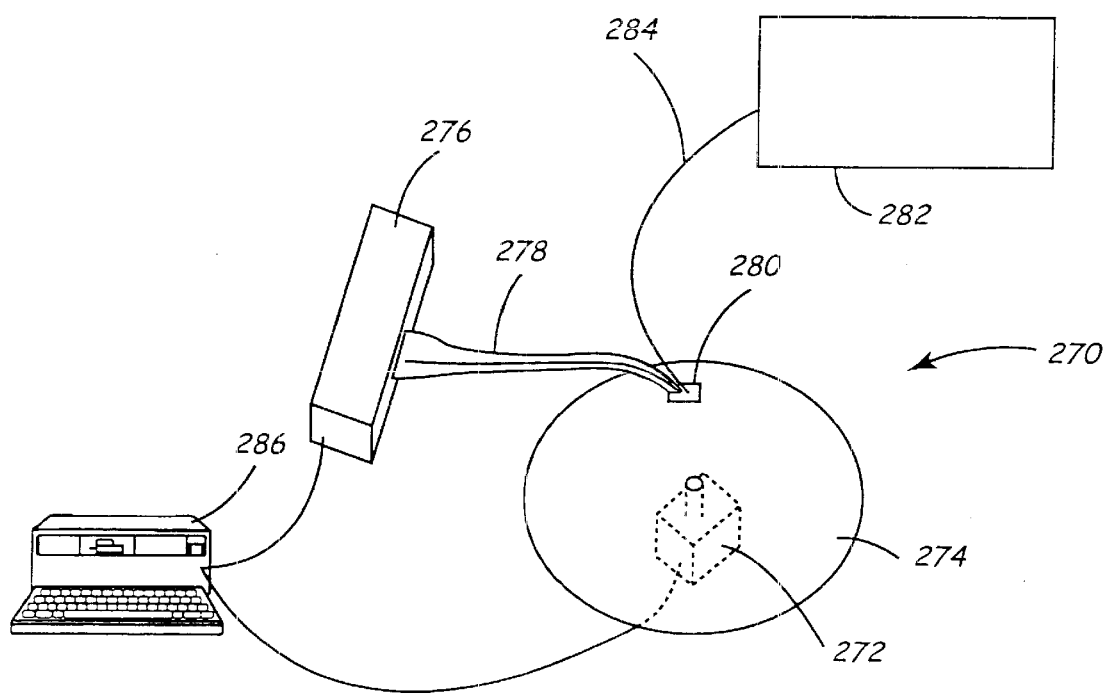
FIG. 10 is a schematic view of a data storage device for use with an magneto-optical disc.
Figure 11A:
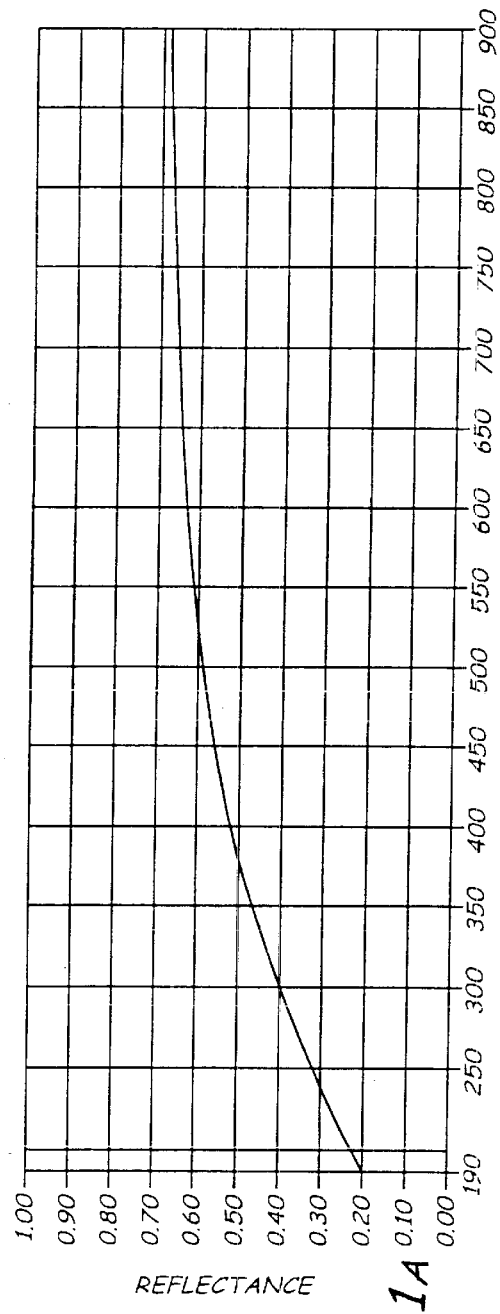
FIG. 11A is a plot of reflectance as a function of light wavelength for a magneto-optical disc with a structure essentially as shown in FIG. 5 with a hydrogenated carbon film.
Figure 11B:
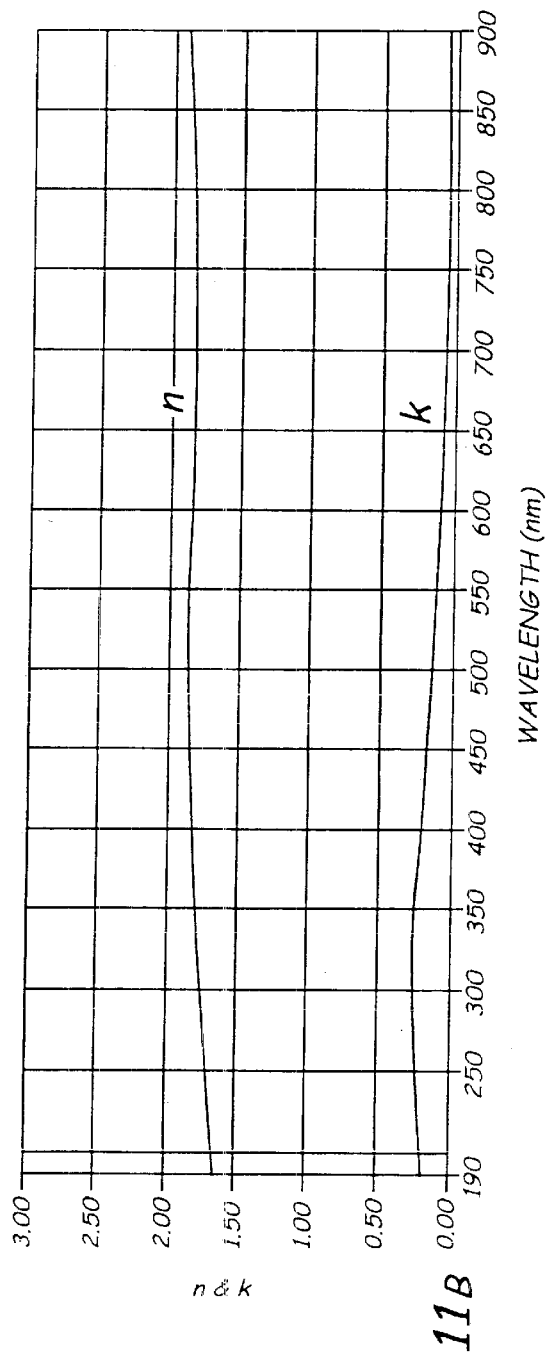
FIG. 11B is a plot of index of refraction and the absorption coefficient obtained with the optical disc used to produce the plot of FIG. 11A.
Figure 12A:
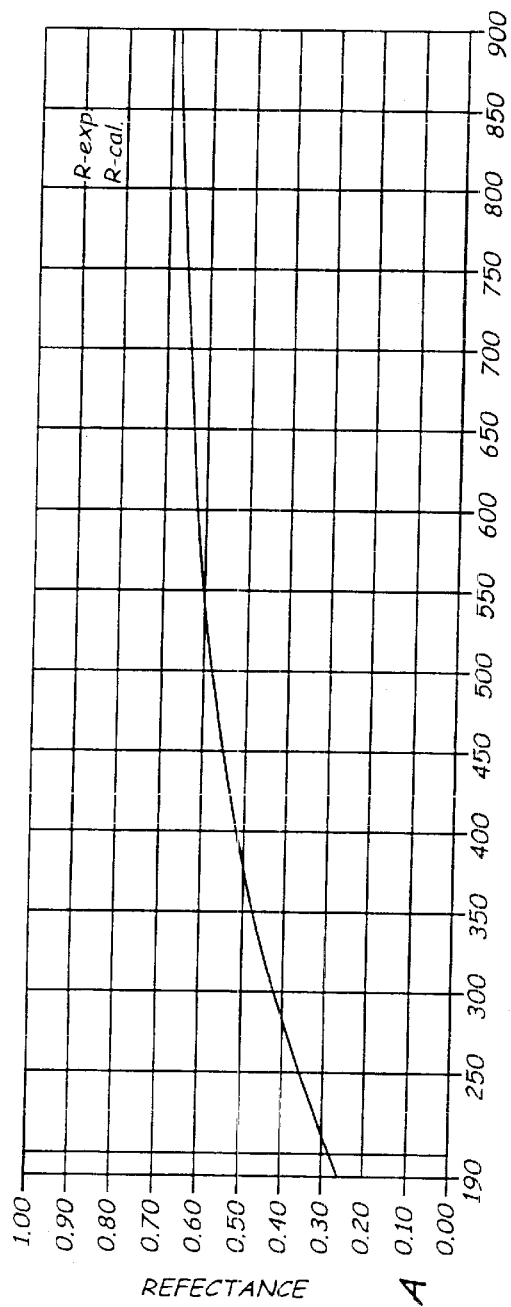
FIG. 12A is a plot of reflectance as a function of light wavelength for a magneto-optical disc with a structure essentially as shown in FIG. 5 with a nitrogenated carbon film.
Figure 12B:
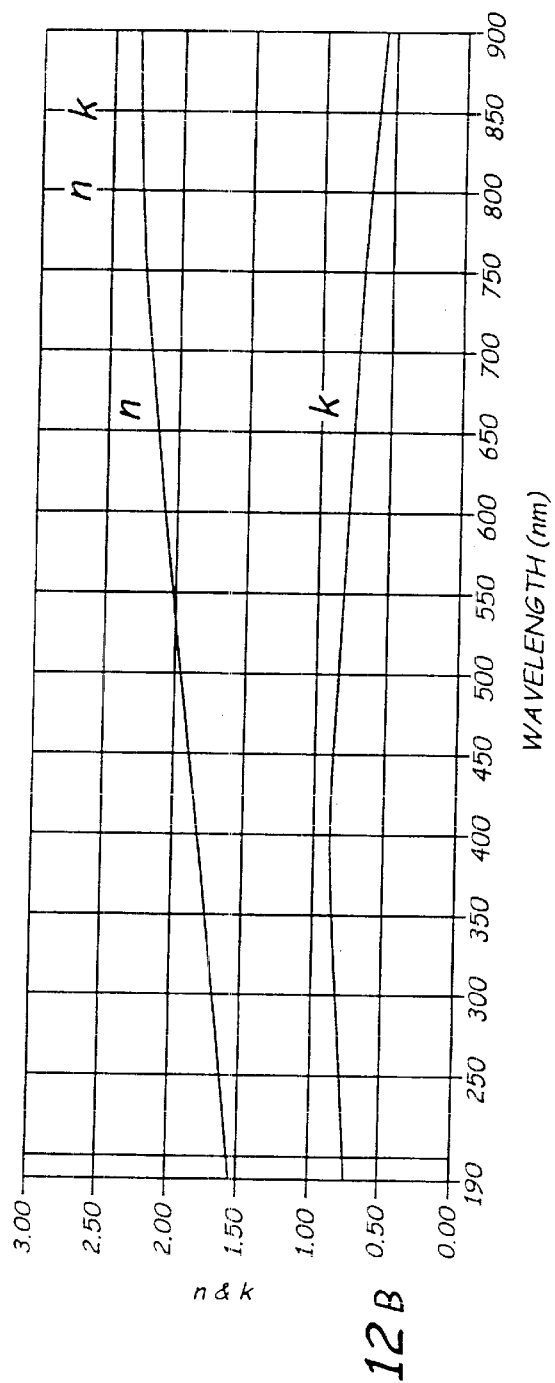
FIG. 12B is a plot of index of refraction and the absorption coefficient obtained with the optical disc used to produce the plot of FIG. 12A.
Figure 13A:
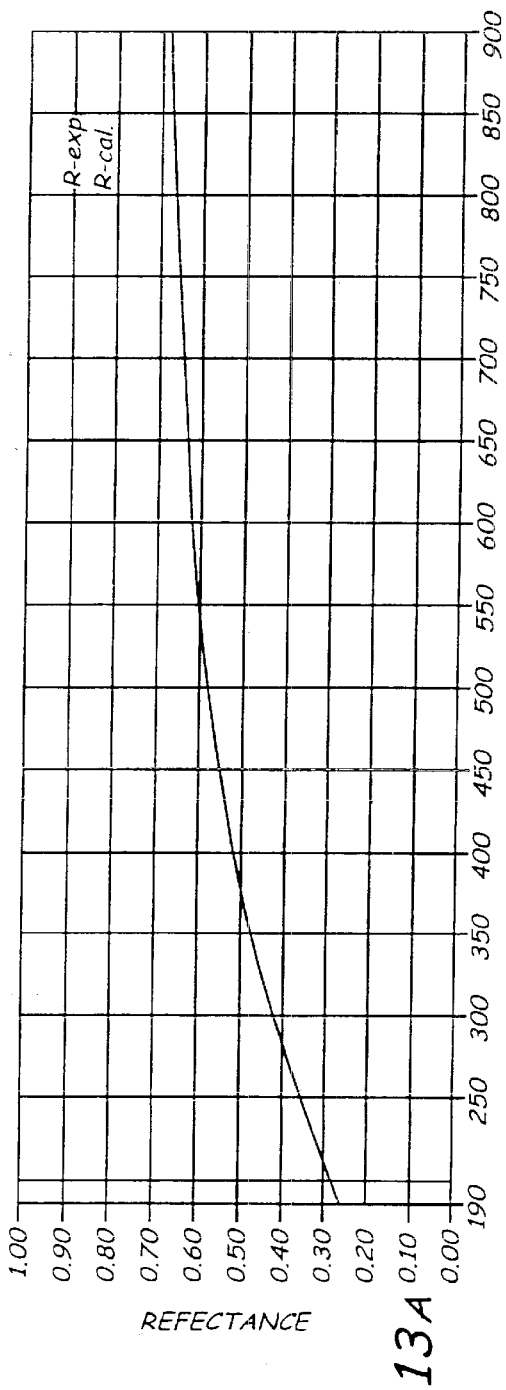
FIG. 13A is a plot of reflectance as a function of light wavelength for a magneto-optical disc with a structure essentially as shown in FIG. 5 with a hydro-nitrogenated carbon film.
Figure 13B:
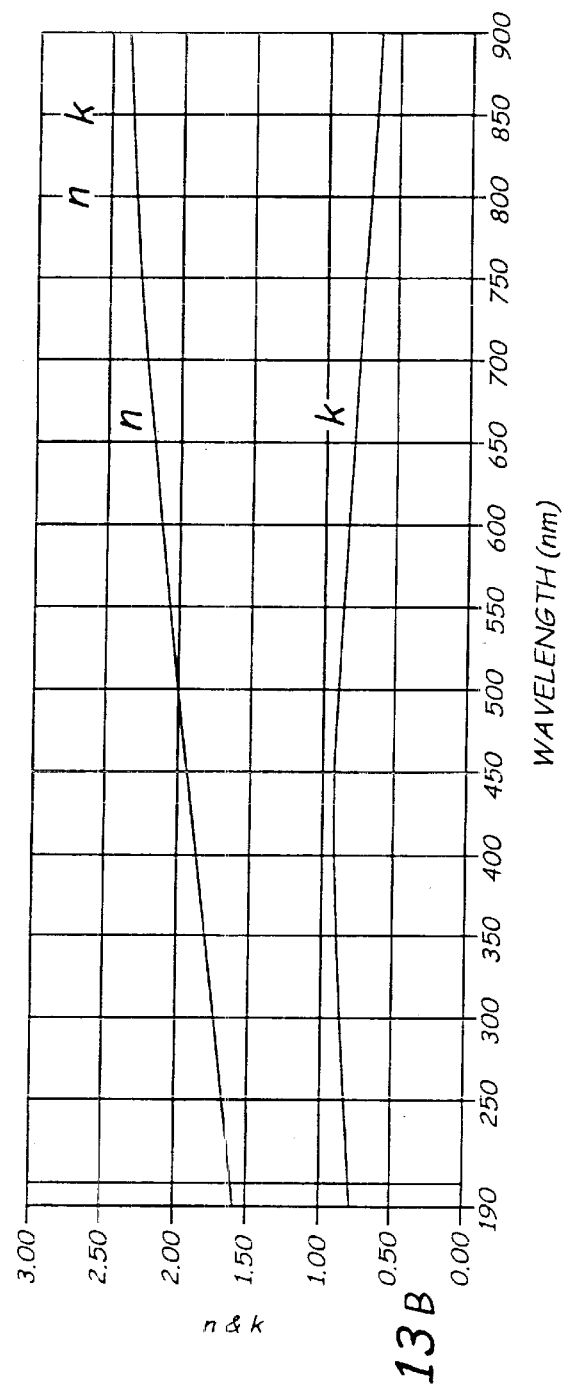
FIG. 13B is a plot of index of refraction and the absorption coefficient obtained with the optical disc used to produce the plot of FIG. 13A.

For each film the reflectivity, index of refraction and absorption coefficient were measured. The results are plotted in FIG. 10 for the hydrogenated carbon film, FIG. 11 for the nitrogenated carbon film and FIG. 12 for the hydro-nitrogenated carbon film. The reflectivity is plotted in the A panels of FIGS. 10–12 while the index of refraction and the absorption coefficient are plotted in the B panel of FIGS. 10–12. The reflectivity is roughly the same for the discs with the three carbon films. The reflectivity increases from 190 nm to about 800 nm and reaches a plateau from about 800 to about 900 nm.

For the magneto-optical disc with the hydrogenated carbon coating, the index of refraction gradually increases to about 500 nm and then slowly decreases as a function of wavelength. For the magneto-optical disc with the nitrogenated carbon coating, the index of refraction increases over the whole frequency range from 190 nm to about 900 nm.

Similarly, for the magneto-optical disc with the hydro-nitrogenated carbon coating, the index of refraction increases over the whole frequency range from 190 nm to 900 nm.

For the magneto-optical disc with the hydrogenated carbon coating, the absorption coefficient increases slowly from 190 nm to about 300 nm and reaches a plateau from about 300 nm to about 350 nm at a maximum value of about 0.25. At higher wavelengths, the absorption decreases slowly from about 350 nm to about 800 nm where another plateau is reached. The absorption coefficient reaches a minimum value of about 0.02. By increasing the hydrogen content of the carbon film to values from about 30–35 mole percent hydrogen, it is possible to get an absorption coefficient of about 0 with 660 nm light.

The plots of the absorption coefficients for the magneto-optical discs with the nitrogenated carbon coating and hydro-nitrogenated carbon coating are similar. The absorption coefficient for the nitrogenated carbon coated disc reaches a maximum of about 0.9 at about 450 nm and reaches a minimum of about 0.55 at 900 nm. The absorption coefficient for the hydro-nitrogenated carbon coated disc reaches a maximum of about 0.9 at about 475 nm and reaches a minimum of about 0.6 at 900 nm. The lower absorption coefficient for the hydrogenated carbon coated disc indicated that a hydrogenated carbon overcoat is preferred for magneto-optical discs over either a nitrogenated carbon overcoat and a hydro-nitrogenated carbon overcoat.

To evaluate the improved durability as a result of having a carbon overcoat, Contact-Start-Stop tests were performed on magneto-optical discs using a model T1000 CSS tester from TTi, Milpitas, Calif. During one cycle of the test, a slider starts in contact with the surface of a nonrotating disc. The disc was then rotated to a selected maximum speed and held at that speed for a selected number of second before the disc was decelerated and stopped. After being stopped for a short period, the cycle was repeated. The disc was examined for damage to the disc surface using an optical microscope with a 2000× magnification.

Five magneto-optical discs with different hydrogenated carbon coating thicknesses were tested. The disc had a 23 Å lubricant layer of Z-dol with a molecular weight from 2000 to 4000. The first disc had a layered structure as shown in FIG. 5 except that is lacked layer 186, the carbon layer. The disc had a 800 Å silicon nitride overcoat layer. The remaining four discs included a hydrogenated carbon layer between the silicon nitride and the lubricant layers. Four different carbon layer thicknesses were measured.

If the magneto-optical disc does not include a carbon coating, it cannot survive even on CSS test cycle. The inclusion of a even a 25 Å carbon coating eliminates damage to the disc for greater than 20,000 CSS cycles. Thicker hydrogenated carbon coatings also produced discs that survived for greater than 20,000 CSS cycles. Thus, the inclusion of a carbon layer provides dramatic improvement in the durability of the magneto-optical discs. This improved durability allows for the use of reduced fly heights in magneto-optical disc drives without resulting in unacceptably short disc lifetimes. Other observations of the carbon coated discs with a lubricant coating indicate that the discs have acceptable values of stiction with read/write heads.

Although the present invention has been described with reference to preferred embodiments, workers skilled in the art will recognize that changes may be made in form and detail without departing from the spirit and scope of the invention.

What is claimed is:

1. A method of producing a magneto-optical disc comprising depositing a carbon layer onto a disc with a magnetic layer comprising a magnetic metal or alloy having a Curie temperature accessible by optical heating, wherein the carbon layer is formed of hydrogenated carbon, nitrogenated carbon or hydro-nitrogenated carbon to have an absorption coefficient less than about 0.3 at a selected wavelength between about 190 nm and 900 nm.

2. The method of claim 1 wherein the carbon layer is deposited by sputtering.

3. The method of claim 2 wherein the sputtering is performed in the presence of hydrogen.

4. The method of claim 1 further comprising applying a lubricant layer over the carbon layer.

5. The method of claim 4 wherein the carbon layer has a thickness greater than about 25 Å.

6. A method of producing a magneto-optical disc, comprising:

forming a disc substrate having first and second disc sides;

depositing a first undercoat on the first side of the disc substrate, the first undercoat comprising dielectric material;

depositing a first magnetic layer on the first undercoat; the first magnetic layer comprising a magnetic metal or alloy having a Curie temperature accessible by optical heating; and depositing a first carbon layer over the first magnetic layer, the first carbon layer comprising hydrogenated carbon, nitrogenated carbon or hydro-nitrogenated carbon to have an absorption coefficient less than about 0.3 at a selected wavelength between about 190 nm and 900 nm.

7. The method of claim 6, further comprising: depositing a first layer of lubricant over the first carbon layer.

8. The method of claim 6, further comprising:

depositing a first overcoat between the first magnetic layer and the first carbon layer; the first overcoat comprising dielectric material.

9. The method of claim 8, further comprising:

depositing a first layer of lubricant over the first carbon layer.

10. The method of claim 6, further comprising:

depositing a second undercoat on the second side of the disc substrate, the second undercoat comprising dielectric material;

depositing a second magnetic layer on the second undercoat; the second magnetic layer comprising a magnetic metal or alloy having a Curie temperature accessible by optical heating; and depositing a second carbon layer over the second magnetic layer, the second carbon layer comprising hydrogenated carbon, nitrogenated carbon or hydro-nitrogenated carbon to have an absorption coefficient less than about 0.3 at a selected wavelength between about 190 nm and 900 nm.

11. The method of claim 10, further comprising:

depositing a second layer of lubricant over the second carbon layer.

12. The method of claim 10, further comprising:

depositing a second overcoat between the second magnetic layer and the second carbon layer; the second overcoat comprising dielectric material.

13. The method of claim 12, further comprising:

depositing a second layer of lubricant over the second carbon layer.

14. A method of producing a magneto-optical disc, comprising:

forming a disc substrate having first and second disc sides;

depositing a first magnetic layer over the first side of the disc substrate; the first magnetic layer comprising a magnetic metal or alloy having a Curie temperature accessible by optical heating;

depositing a first overcoat on the first magnetic layer, the first overcoat comprising dielectric material; and depositing a first carbon layer over the first overcoat, the first carbon layer comprising hydrogenated carbon, nitrogenated carbon or hydro-nitrogenated carbon to have an absorption coefficient less than about 0.3 at a selected wavelength between about 190 nm and 900 nm.

15. The method of claim 14, further comprising:

depositing a first layer of lubricant over the first carbon layer.

16. The method of claim 14, further comprising:

depositing a first undercoat between the first magnetic layer and the first side of the disc substrate; the first undercoat comprising dielectric material selected from the group consisting of $SiN_x$, $SiO_x$, AlN, $AlO_x$.

17. The method of claim 16, further comprising:

depositing a first layer of lubricant over the first carbon layer.

18. The method of claim 14, further comprising:

depositing a second magnetic layer over the second side of the disc substrate; the second magnetic layer comprising a magnetic metal or alloy having a Curie temperature accessible by optical heating;

depositing a second overcoat on the second magnetic layer, the second overcoat comprising dielectric material; and depositing a second carbon layer over the second overcoat, the second carbon layer comprising hydrogenated carbon, nitrogenated carbon or hydro-nitrogenated carbon to have an absorption coefficient less than about 0.3 at a selected wavelength between about 390 nm and 900 nm.

* * * * *

UNITED STATES PATENT AND TRADEMARK OFFICE
CERTIFICATE OF CORRECTION

PATENT NO.     : 6,576,095 B2
DATED          : June 10, 2003
INVENTOR(S)    : Ga-Lane Chen et al.

It is certified that error appears in the above-identified patent and that said Letters Patent is hereby corrected as shown below:

Column 12,
Line 55, delete "390" and insert -- 190 --.

Signed and Sealed this

Sixth Day of April, 2004

JON W. DUDAS
*Acting Director of the United States Patent and Trademark Office*